(12) United States Patent
Yu et al.

(10) Patent No.: US 12,221,155 B2
(45) Date of Patent: Feb. 11, 2025

(54) DIFFERENTIAL DRIVE DEVICE AND AGV

(71) Applicant: HANGZHOU HIKROBOT CO., LTD., Hangzhou (CN)

(72) Inventors: Wentao Yu, Hangzhou (CN); Chao Wu, Hangzhou (CN)

(73) Assignee: HANGZHOU HIKROBOT CO., LTD., Hangzhou (CN)

( * ) Notice: Subject to any disclaimer, the term of this patent is extended or adjusted under 35 U.S.C. 154(b) by 778 days.

(21) Appl. No.: 17/437,328

(22) PCT Filed: Apr. 27, 2020

(86) PCT No.: PCT/CN2020/087264
§ 371 (c)(1),
(2) Date: Sep. 8, 2021

(87) PCT Pub. No.: WO2020/244341
PCT Pub. Date: Dec. 10, 2020

(65) Prior Publication Data
US 2022/0177032 A1 Jun. 9, 2022

(30) Foreign Application Priority Data

Jun. 6, 2019 (CN) .......................... 201910494728.7
Jun. 6, 2019 (CN) .......................... 201920858917.3
Apr. 22, 2020 (CN) .......................... 202010322808.7

(51) Int. Cl.
*B60K 7/00* (2006.01)
*B60K 17/04* (2006.01)
(Continued)

(52) U.S. Cl.
CPC ............ *B62D 11/04* (2013.01); *B60K 7/0007* (2013.01); *F16C 35/06* (2013.01); *B60K 17/043* (2013.01); *F16C 2361/61* (2013.01)

(58) Field of Classification Search
CPC .... B62D 11/04; B60K 7/0007; B60K 17/043; F16C 35/06; F16C 2361/61
See application file for complete search history.

(56) References Cited

U.S. PATENT DOCUMENTS 9,582,001 B1 2/2017 Holmberg et al.

FOREIGN PATENT DOCUMENTS

| CN | 202911548 | 5/2013 |
| CN | 205113439 | 3/2016 |

(Continued)

OTHER PUBLICATIONS

Extended European Search Report issued in Corresponding European Patent Application No. 20818056.2, dated Mar. 24, 2022.

(Continued)

*Primary Examiner* — Jacob D Knutson
(74) *Attorney, Agent, or Firm* — NORTON ROSE FULBRIGHT US LLP

(57) ABSTRACT

The present application discloses a differential drive device applied to an AGV, relating to the field of wheeled drivers, and being able to effectively reduce the total height of the differential drive device. The differential drive device includes a differential drive unit (2), a top plate (1) and an outer cover (3). The top plate (1) is installed on a top end of the outer cover (3). The differential drive unit (2) is located in the outer cover (3) at a lower side of the top plate (1). The top plate (1) is supported on the differential drive unit (2). An inner side wall of the outer cover (3) is circular-shaped. The present application applies to apparatuses with transportation functions.

20 Claims, 7 Drawing Sheets

(51) Int. Cl.
  *B62D 11/04*  (2006.01)
  *F16C 35/06*  (2006.01)

(56) References Cited

FOREIGN PATENT DOCUMENTS

| | | | |
|---|---|---|---|
| CN | 206125225 | | 4/2017 |
| CN | 107035188 | A | 8/2017 |
| CN | 207536016 | | 6/2018 |
| CN | 207657586 | | 7/2018 |
| CN | 207697493 | | 8/2018 |
| CN | 108945147 | | 12/2018 |
| CN | 208360357 | | 1/2019 |
| CN | 208360357 | U * | 1/2019 |
| CN | 109703649 | | 5/2019 |
| CN | 209159801 | | 7/2019 |
| CN | 209535282 | U | 10/2019 |
| CN | 209888988 | U | 1/2020 |
| CN | 210027020 | | 2/2020 |
| DE | 102016107451 | A1 * | 10/2016 |
| DE | 102020108095 | | 9/2021 |
| JP | H0872707 | | 3/1996 |
| WO | WO 2018/087698 | | 5/2018 |
| WO | WO-2018087698 | A1 * | 5/2018 ............. B60G 17/00 |
| WO | WO 2018211481 | A1 | 11/2018 |
| WO | WO 2019242315 | A1 | 12/2019 |
| WO | WO 2021190687 | A1 | 9/2021 |

OTHER PUBLICATIONS

Office Action issued in Chinese Patent Application No. 202010322808.7, dated Apr. 1, 2022 (English machine translation provided).

Office Action issued in Corresponding Chinese Application No. 201910494728.7, dated Nov. 23, 2021 (English Translation provided).

International Search Report and Written Opinion issued in Corresponding PCT Application No. PCT/CN2020/087264, dated Jul. 30, 2020 (English Translation provided).

Notice of Allowance issued in corresponding European Application No. 20818056.2 dated Aug. 22, 2024.

* cited by examiner

DIFFERENTIAL DRIVE DEVICE AND AGV

CROSS REFERENCE TO RELATED APPLICATIONS

The present application is a national phase application under 35 U.S.C. § 371 of International Application No. PCT/CN2020/087264, filed Apr. 27, 2020, which claims the benefit of priority to Chinese patent application No. 201910494728.7 filed with the China National Intellectual Property Administration on Jun. 6, 2019 and entitled "Differential Drive Device", Chinese patent application No. 201920858917.3 filed with the China National Intellectual Property Administration on Jun. 6, 2019 and entitled "Differential Drive Device", and Chinese patent application No. 202010322808.7 filed with the China National Intellectual Property Administration on Apr. 22, 2020 and entitled "Drive Device And AGV With The Drive Device", each of which are incorporated herein by reference in their entirety.

TECHNICAL FIELD

The present application relates to the technical field of wheeled drivers, in particular to a differential drive device and an AGV.

BACKGROUND

The current automated guided vehicle (AGV) is mostly driven by a differential drive device. The differential drive device refers to an integrated mechanical structure which integrates a drive motor, a reducer, a driving wheel, etc. Compared with the traditional AGV differential control mode, the differential drive device has high integration and strong adaptability, which can rapidly deploy AGVs, mobile robots, etc.

The slewing bearing is generally used to realize the rotation connection between the differential drive device and the vehicle body. However, the slewing bearing must occupy the height of the differential drive device in the vertical direction, which leads to the problem that the total height of the differential drive device is relatively large and its application is limited in the scene with high requirements for height space.

SUMMARY

An object of the embodiments of the present application is to provide a differential drive device and an AGV to effectively reduce the total height of the differential drive device. The specific technical solutions are as follows:

An embodiment of the present application provides a differential drive device including a differential drive unit, a top plate and an outer cover. The top plate is installed on a top end of the outer cover. The differential drive unit is located in the outer cover at a lower side of the top plate. The top plate is supported above the differential drive unit. An inner side wall of the outer cover is circular-shaped.

Optionally, a first rolling member is provided on a side of the differential drive unit. The first rolling member is in rolling connection with the lower side of the top plate.

Optionally, two first rolling members are installed on the side of the differential drive unit. The two first rolling members are arranged symmetrically about a center of slewing of the differential drive unit.

Optionally, a second rolling member is provided on the side of the differential drive unit. The second rolling member is in rolling connection with the inner side wall of the outer cover.

Optionally, two second rolling members are installed on the side of the differential drive unit. The two second rolling members are arranged symmetrically about the center of slewing of the differential drive unit.

Optionally, a first rolling member is provided on the side of the differential drive unit. The first rolling member is in rolling connection with the lower side of the top plate. An end of the first rolling member close to the inner side wall of the outer cover is provided with a groove, and a second rolling member is installed in the groove. The second rolling member partially protrudes out of the groove and is rotatably connected to the inner side wall of the outer cover.

Optionally, the second rolling member is a roller bearing. A bearing seat is provided on a side wall of the differential drive unit, and the roller bearing is installed on the bearing seat.

Optionally, a top end of the first rolling member is higher than the differential drive unit. A slewing diameter of the differential drive unit is smaller than an inner diameter of the outer cover.

Optionally, a pin shaft is provided on the side of the differential drive unit. An annular limiting slot is provided at a position on the inner side wall of the outer cover corresponding to the pin shaft. An end of the pin shaft close to the outer cover is located in the limiting slot.

Optionally, the differential drive unit includes a first motor, a second motor, a first reducer, a second reducer, a first driving wheel and a second driving wheel, wherein the first motor and the second motor are arranged side by side, and output shafts of the first motor and the second motor face away from each other; the first reducer is connected to the output shaft of the first motor, and the second reducer is connected to the output shaft of the second motor; the first driving wheel is installed on a side of the first reducer facing away from the first motor, and the second driving wheel is installed on a side of the second reducer facing away from the second motor.

Optionally, a through-hole is provided on the top plate, and the differential drive unit is connected to the AGV through the through-hole.

Optionally, the differential drive unit further includes: a support body;
the differential drive unit is hinged to the support body, so that the differential drive unit swings around a transverse axis relative to the support body;
the top plate and the outer cover are enclosed to form a mounting frame, and a receptacle cavity is formed in the mounting frame, the support body and the differential drive unit are arranged in the receptacle cavity, the support body supports the mounting frame, and the differential drive unit is arranged in a rotatable manner around a longitudinal axis of the receptacle cavity.

Optionally, the support is a horizontal support plate, and the differential drive unit is arranged below the horizontal support plate.

Optionally, the differential drive device further includes a connecting shaft. The differential drive unit and the horizontal support plate are connected by the connecting shaft, and a central axis of the connecting shaft coincides with the transverse axis.

Optionally, the support body includes two vertical plates arranged at intervals, and the differential drive unit is arranged between the two vertical plates.

Optionally, the differential drive device further includes a connecting shaft, the two vertical plates and the differential drive unit are connected by the connecting shaft, and the central axis of the connecting shaft coincides with the transverse axis.

Optionally, a ring-shaped limiting slot is formed on the side wall of the receptacle cavity. The end of the connecting shaft extends out of the differential drive unit and is arranged in the limiting slot.

Optionally, the differential drive device further includes a first rolling member, and the first rolling member is arranged between the differential drive unit and the outer cover or between the support body and the outer cover.

Optionally, the first rolling member is a ball, a roller or a bearing.

Optionally, the differential drive device further includes a plurality of second rolling members arranged on the support body, and the support body supports the top plate through the plurality of second rolling members.

Optionally, the second rolling member is a ball, a roller or a bearing.

Optionally, the differential drive unit includes a driving wheel and a power unit connected to the driving wheel, and the power unit is hinged to the support body.

Optionally, an axle of the driving wheel is perpendicular to the transverse axis.

The embodiment of the present application further provides an AGV including the differential drive device described above.

The embodiment of the present application provides a differential drive device and an AGV. A differential drive unit is located in an inverted barrel-shaped container composed of a top plate and an outer cover. The top plate is supported by the differential drive unit, and a bottom end of the outer cover is higher than a bottom end of the differential drive unit, so that the differential drive unit can move away from the top plate and the outer cover. Since the differential drive unit itself can rotate, the differential drive unit can rotate relative to the top plate and the outer cover. In summary, the differential drive device can realize the functions of differential rotation in-situ and forward and backward walking. The differential drive device according to the present embodiment uses the top plate and the outer cover instead of a slewing bearing. Since the thickness of the top plate can be much smaller than the height of the slewing bearing, the differential drive device according to the present embodiment can effectively reduce the total height of the differential drive device.

BRIEF DESCRIPTION OF DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

The embodiments of the present application provide a differential drive device and an AGV, which can effectively reduce the total height of the differential drive device.

Figure 1:
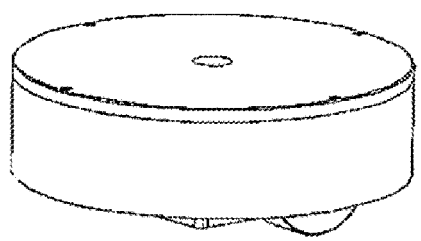
FIG. 1 is an isometric view of a differential drive device according to an embodiment of the present application.
Figure 2:
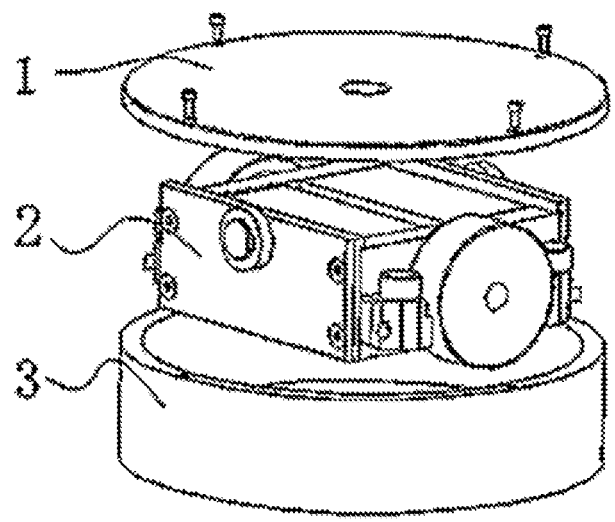
FIG. 2 is a partial exploded view of a differential drive device according to an embodiment of the present application.

FIG. 1 and FIG. 2 are schematic structural diagrams of the differential drive device according to an embodiment of the present application. As shown in FIG. 1 and FIG. 2, the differential drive device of this embodiment includes a differential drive unit 2, a top plate 1 and an outer cover 3. The top plate 1 is installed on a top end of the outer cover 3. The differential drive unit 2 is located in the outer cover 3 at a lower side of the top plate 1. The top plate 1 is supported above the differential drive unit 2. An inner side wall of the outer cover 3 is circular-shaped.

In this embodiment, the differential drive unit refers to an integrated mechanical structure which integrates a drive motor, a reducer and a driving wheel, which can not only travel in a straight line and can also realize the function of steering. The differential drive unit is located in an inverted barrel-shaped container composed of the top plate and the outer cover, and the top plate is supported above the differential drive unit, i.e. the top plate is supported by the differential drive unit. A bottom end of the outer cover is higher than a bottom end of the differential drive unit, so that the differential drive unit can move away from the top plate and the outer cover.

Also, since the differential drive unit itself can rotate, the differential drive unit can rotate relative to the top plate and the outer cover. At this time, sliding friction occurs between the top end of the differential drive unit and the top plate, and sliding friction occurs between the side of the differential drive unit and the inner side wall of the outer cover. In summary, the differential drive device can realize the functions of differential rotation in-situ and forward and backward walking.

When the differential drive device is applied to an AGV, the AGV refers to a transport vehicle equipped with electromagnetic or optical automatic guidance devices, which can travel along a defined guidance path, have safety protection and various transfer functions. The AGV belongs to the category of Wheeled Mobile Robot (WMR).

Optionally, a through-hole is provided on the top plate, and the differential drive unit is connected to the automated guided vehicle through the through-hole.

The top plate and/or the outer cover is fixed on the body of the AGV, and the through-hole can be open on the top plate. The wiring between the differential drive unit and the AGV is realized through the through-hole opened on the top plate (for example, motor power supply line of the differential drive unit needs to be connected to battery of the AGV), that is, the differential drive device is applied to the AGV, thereby realizing the relative rotation between the differential drive unit and the vehicle body. The differential drive device provided by this embodiment uses the top plate and the outer cover instead of the slewing bearing. Since the thickness of the top plate can be much smaller than the height of the slewing bearing, the differential drive device provided by this embodiment can effectively reduce the total height of the differential drive device.

Figure 3:
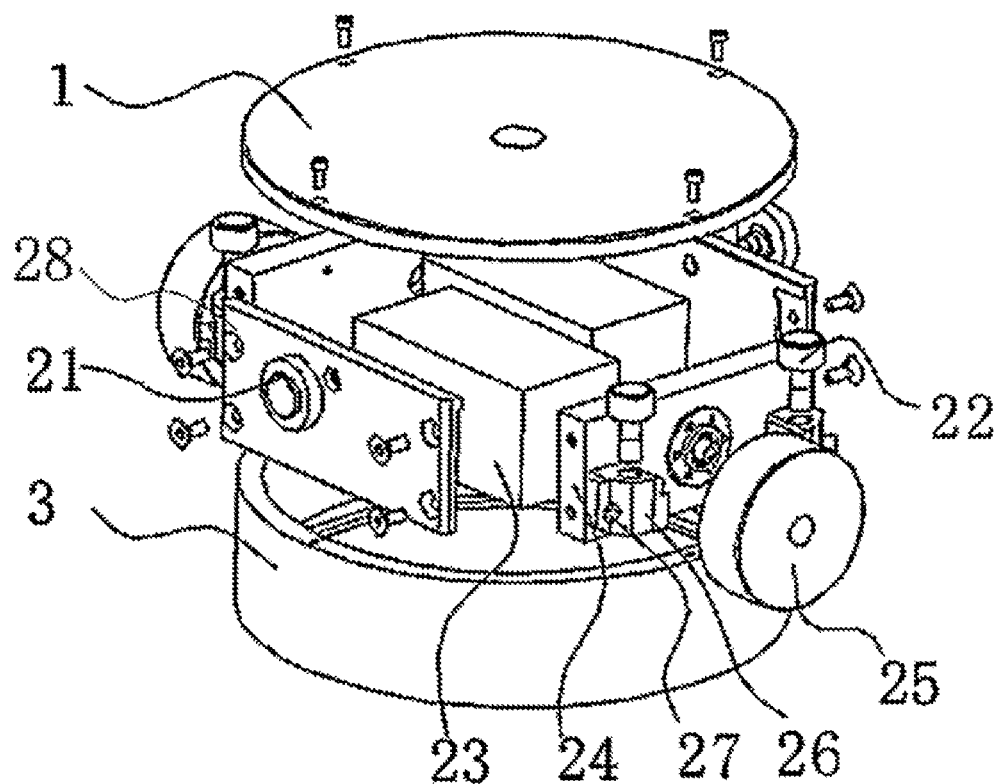
FIG. 3 is an overall exploded view of a differential drive device according to an embodiment of the present application.

As shown in FIG. 3, optionally, a first rolling member 21 is provided on a side of the differential drive unit 2. The first rolling element 21 is in rolling connection with the lower side of the top plate 1.

In this embodiment, when the differential drive unit rotates relative to the top plate, the first rolling member rotatably connected to the lower side of the top plate can reduce the friction between the differential drive unit and the top plate, thereby reducing the wear of the differential drive unit and the top plate, extending the service life of the differential drive device, and improving the motion accuracy of the differential drive unit. In addition, the first rolling member is arranged at the side instead of the top of the differential drive unit, which can reduce the influence of the overall height of the first rolling member on the total height of the differential drive device. For example, when installing the first rolling member, the highest point of the first rolling member should be higher than the differential drive unit. As for the height difference between the highest point of the first rolling member and the highest point of the differential drive unit, it can be adjusted accordingly according to actual needs. In this embodiment, the first rolling member is installed at the side of the differential drive unit, which can effectively reduce the overall height of the differential drive unit compared with the current technical solution where the slewing bearing is installed on the top end of the differential drive unit.

As shown in FIG. 3, optionally, two first rolling members 21 are installed on the side of the differential drive unit 2. The two first rolling members 21 are arranged symmetrically about a center of slewing of the differential drive unit 2.

In this embodiment, the two first rolling members are arranged symmetrically about the center of slewing of the differential drive unit, which can balance the force when the differential drive unit contacts the top plate, thereby reducing the situation that the differential drive unit tilts under the pressure of the top plate. In turn, the stability of the differential drive device is improved.

As shown in FIG. 3, optionally, the first rolling member 21 can be a roller bearing. The roller bearing has the characteristics of simple installation structure and easy installation. Therefore, the use of the roller bearing for the first rolling member can simplify the structure of the differential drive device and improve the assembly efficiency of the differential drive device.

It can be understood that the first rolling member can also be a ball, a bullseye wheel, etc., which can also achieve the effect of reducing the friction between the differential drive unit and the top plate.

As shown in FIG. 3, in the case of the first rolling member 21 being the roller bearing, optionally, a side plate 28 is connected to the side of the differential drive unit 2, and the roller bearing is installed on the side plate 28.

In this embodiment, an axis of the first rolling member is horizontal. The rolling connection between the roller bearing and the top plate can be realized by installing a shaft head of the roller bearing on the side plate. And the roller bearing and the top plate are in line contact, which can reduce the local force on the top plate and increase the service life of the top plate. In addition, the installation method of the roller bearing is simple. For example, if the roller bearing with threads on the shaft head and the side plate with threaded holes are selected, the roller bearing and the side plate can be connected by threads. The threaded connection method is simple and reliable, which improves the convenience of installation and disassembly of the first rolling member.

Also, the first rolling member is installed on the side plate instead of directly on the differential drive unit, which can reduce the installation positions on the differential drive unit and improve the structural strength of the differential drive unit. After the first rolling member is assembled with the side plate as a whole, it can be connected to the side wall of the differential drive unit by a fastener.

As shown in FIG. 3, optionally, when the two first rolling members 21 are installed on the side of the differential drive unit 2, the two first rolling members 21 are symmetrically arranged about the center of slewing of the differential drive unit 2, and the center axis of slewing of the roller bearing can be perpendicular to and intersect with the center axis of slewing of the differential drive unit 2 when the first rolling member 21 is a roller bearing and is installed on the side of the differential drive unit 2.

In this embodiment, the roller bearing is arranged as described above, which can reduce the rolling friction between the roller bearing and the top plate, and can also balance the force on the two symmetrically arranged roller bearings, so that the differential drive unit can achieve differential rotation in situ as much as possible.

As shown in FIG. 3, optionally, a second rolling member 22 is provided on the side of the differential drive unit 2. The second rolling member 22 is in rolling connection with the inner side wall of the outer cover 3.

In this embodiment, when the differential drive unit rotates relative to the outer cover, the second rolling member rotatably connected to the inner side wall of the outer cover can reduce the friction between the differential drive unit and the outer cover, thereby reducing the wear of the differential drive unit and the outer cover, extending the service life of the differential drive device, and improving the motion accuracy of the differential drive unit. In addition, the second rolling member is arranged on the side wall instead of the top or the bottom of the differential drive unit, so that the highest point of the second rolling member can be lower than the highest point of the differential drive unit and the lowest point being can be higher than the lowest point of the differential drive unit when arranging the second rolling member. In this way, the second rolling member does not affect the overall height of the differential drive device.

As shown in FIG. 3, optionally, the second rolling member 22 can also be the roller bearing. In this case, the roller bearing is vertically installed on the side of the differential drive unit. The roller bearing has the characteristics of simple installation structure and easy installation. Therefore, the use of the roller bearing for the second rolling member can simplify the structure of the differential drive device and improve the assembly efficiency of the differential drive device.

As shown in FIG. 3, optionally, two second rolling members 22 are installed on the side of the differential drive unit 2. The two second rolling members 22 are arranged symmetrically about the center of slewing of the differential drive unit 2.

In this embodiment, the two second rolling members are symmetrically arranged on both sides of the differential drive unit, which can not only balance the force on the differential drive unit, but also limit the differential drive unit, thereby reducing the occurrence of the contact between other parts of the differential drive unit and the outer cover during the movement As shown in FIG. 3, optionally, the second rolling member 22 is the roller bearing. A bearing seat 26 is provided on the side wall of the differential drive unit 2, and the roller bearing is installed on the bearing seat 26.

In this embodiment, an axis of the roller bearing is vertical. The rolling connection between the roller bearing and the inner wall of the outer cover can be realized by installing a shaft head of the roller bearing on the bearing seat. And the roller bearing and the outer cover are in line contact, which can reduce the local force on the outer cover and increase the service life of the outer cover. In addition, the installation method of the roller bearing is simpler than that of other bearings. For example, if the roller bearing with threads on the shaft head and the mounting seat with threaded holes are selected, the roller bearing and the mounting seat can be connected by threads. The threaded connection method is simple and reliable, which improves the convenience of installation and disassembly of the second rolling member.

It can be understood that the second rolling member can also be a ball, a bullseye wheel, etc., which can also achieve the effect of reducing the friction between the differential drive unit and the outer cover.

Figure 4:
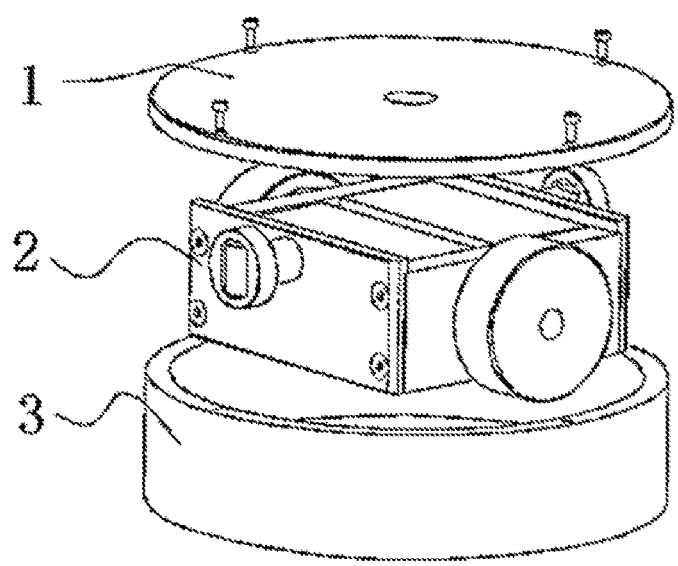
FIG. 4 is a partial exploded view of a differential drive device according to another embodiment of the present application.
Figure 6:
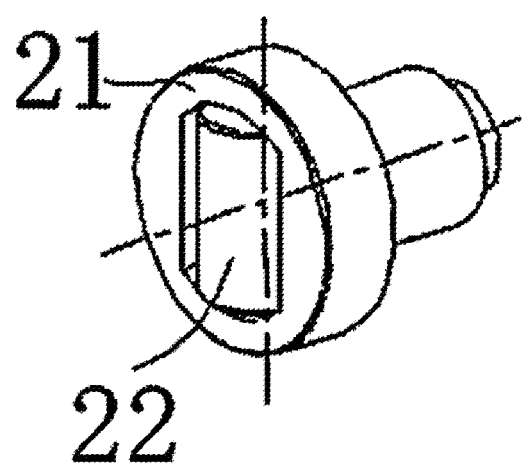
FIG. 6 is an isometric view of a first rolling member and a second rolling member of the differential drive device according to an embodiment of the present application.

As shown in FIG. 4 and FIG. 6, optionally, the first rolling member 21 is provided on the side of the differential drive unit 2. The first rolling member 21 is in rolling connection with the lower side of the top plate 1. One end of the first rolling member 21 close to the inner side wall of the outer cover 3 is provided with a groove, and the second rolling member 22 is installed in the groove. The second rolling member 22 partially protrudes out of the groove and is in rolling connection with the inner side wall of the outer cover 3.

In this embodiment, the differential drive unit is in rolling connection with the top plate through the first rolling member. On the one hand, the first rolling member can reduce the friction between the differential drive unit and the top plate, and on the other hand, it can also be used to carry the force in the vertical direction from the top plate. The differential drive unit is in rolling connection with the inner side wall of the outer cover through the second rolling member. On the one hand, the second rolling member can reduce the friction between the differential drive unit and the outer cover, and on the other hand, it can also be used to carry the force in the horizontal direction from the outer cover. In this embodiment, the first rolling member and the second rolling member are assembled together. Compared with the technical solution in which the first rolling member and the second rolling member are individually installed on the differential drive unit, the installation positions arranged on the differential drive unit can be reduced, thereby improving the structural strength of the differential drive unit.

It can be understood that the number of the first rolling member and the second rolling member is not limited in the embodiments of the present application, and those skilled in the art can make reasonable selections according to actual needs.

As shown in FIG. 2 or FIG. 4, optionally, a top end of the first rolling member 21 is higher than the differential drive unit 2 (see FIG. 3 or FIG. 6). The slewing diameter of the differential drive unit 2 is smaller than an inner diameter of the outer cover 3.

In this embodiment, the first rolling member also constitutes the function of the balance bridge: the differential drive unit is contacted with the top plate through the first rolling member, so the differential drive unit can rotate around the first rolling member, that is, during the operation of the differential drive unit, when the ground is uneven, the differential drive unit can swing around the first rolling member (that is, when one of the driving wheels is raised, the other driving wheel can still keep in contact with the ground). The two driving wheels can be kept in good contact with the ground through this swing, thus reducing the situation that the driving wheels are overhead, which cannot be achieved by using the slewing bearing in the existing differential drive device.

As shown in FIG. 2 or FIG. 4, optionally, when the two first rolling members 21 are installed on the side of the differential drive unit 2 and the two first rolling members 21 are symmetrically arranged about the center of slewing of the differential drive unit 2, the connection line of the two first rolling members 21 can be perpendicular to the connection line of the two driving wheels of the differential drive unit 2 (see FIG. 3 or FIG. 6).

In this embodiment, the two first rolling members constitutes the function of the balance bridge: the differential drive unit is contacted with the top plate through the two first rolling members, so the differential drive unit can rotate around the connection line of the two first rolling members. When the ground is uneven, the differential drive unit can keep the two driving wheels in good contact with the ground through this swing, thereby avoiding the drive wheels from being overhead.

Figure 7:
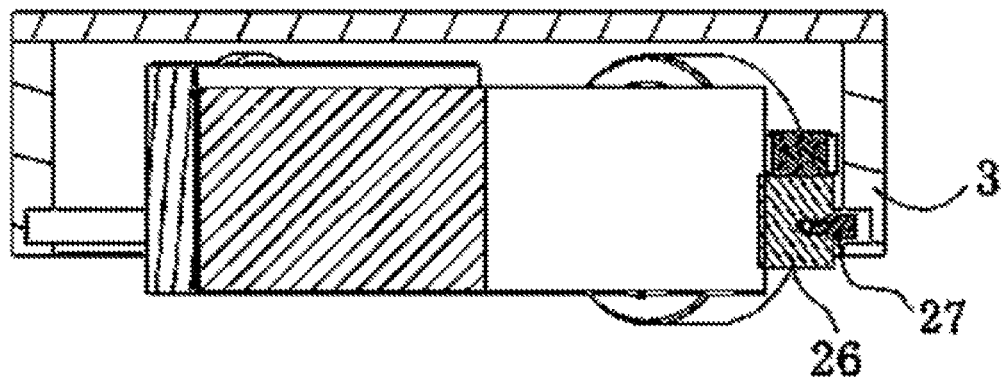
FIG. 7 is a cross-sectional view of a differential drive device according to an embodiment of the present application.
Figure 8:
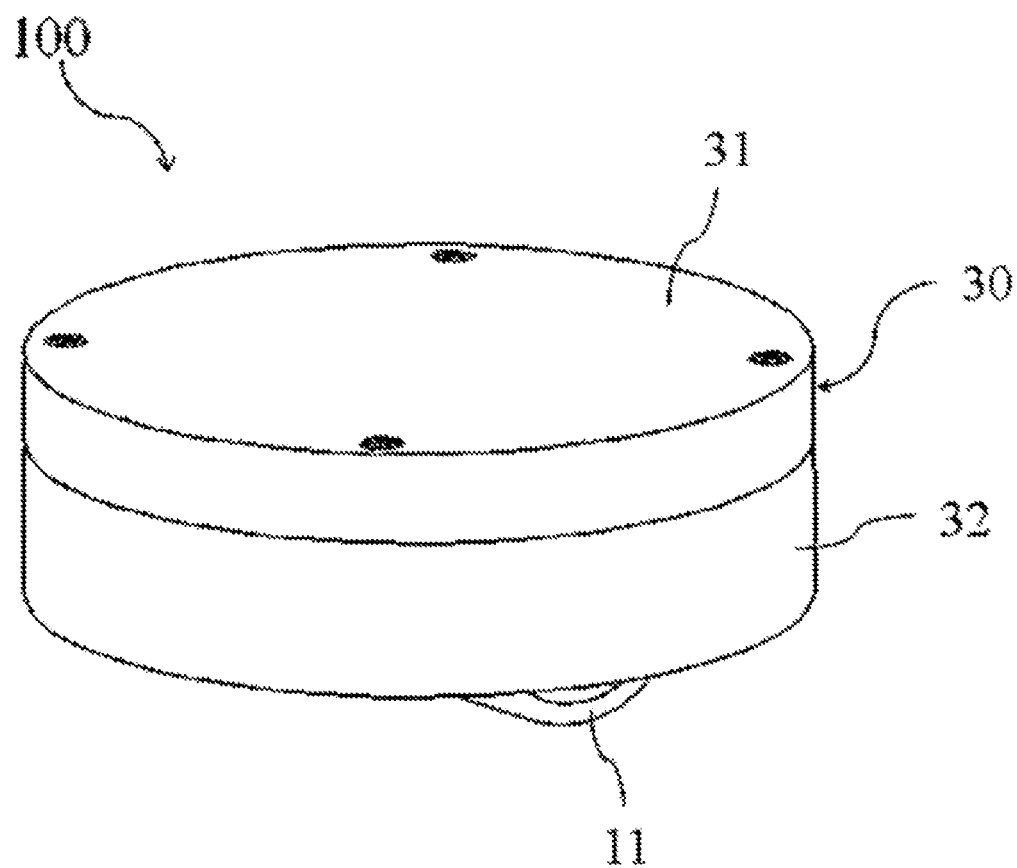
FIG. 8 is a schematic structural diagram of a differential drive device according to an embodiment of the present application.

As shown in FIG. 7, optionally, a pin shaft 27 is provided on the side of the differential drive unit 2. An annular limiting slot is provided at a position on the inner side wall of the outer cover 3 corresponding to the pin shaft 27. An end of the pin shaft 27 close to the outer cover 3 is located in the limiting slot.

In this embodiment, the limiting slot can limit the differential drive unit, prevent the differential drive unit from coming out of the outer cover, and keep the entire differential drive unit as a whole. This embodiment does not limit the number of the pin shafts, and multiple pin shafts can be arranged on the side of the differential drive unit.

Optionally, the outer cover is provided with an installation slot on the lower side of the limiting slot. An upper end of the installation slot communicates with the limiting slot, and a lower end of the installation slot communicates with the lower side of the outer cover. The installation slot is provided with a sealing block detachably connected to the outer cover. In this embodiment, when the differential drive unit and the outer cover are installed as a whole, the sealing block is firstly removed, then the pin shaft is aligned with the lower end of the installation slot, the differential drive unit is pushed upwards, and until the pin shaft is located in the limiting slot, the sealing block is fixed in the installation slot to prevent the pin shaft from falling out, and it finally plays a role in preventing the differential drive unit from falling out of the outer cover.

In this embodiment, the process of removing the differential drive unit from the outer cover and the process of assembling the differential drive unit with the outer cover as a whole are reverse to each other, and will not be repeated here.

As shown in FIG. 3 and FIG. 7, optionally, the pin shaft 27 is installed on the bearing seat 26.

In this embodiment, the pin shaft is installed on the bearing seat, which can reduce the installation positions on the differential drive unit and improve the structural strength of the differential drive unit. Optionally, one end of the pin shaft is provided with threads, the bearing seat is provided with threaded holes, and the pin shaft and the bearing seat are connected through the threaded holes.

Figure 5:
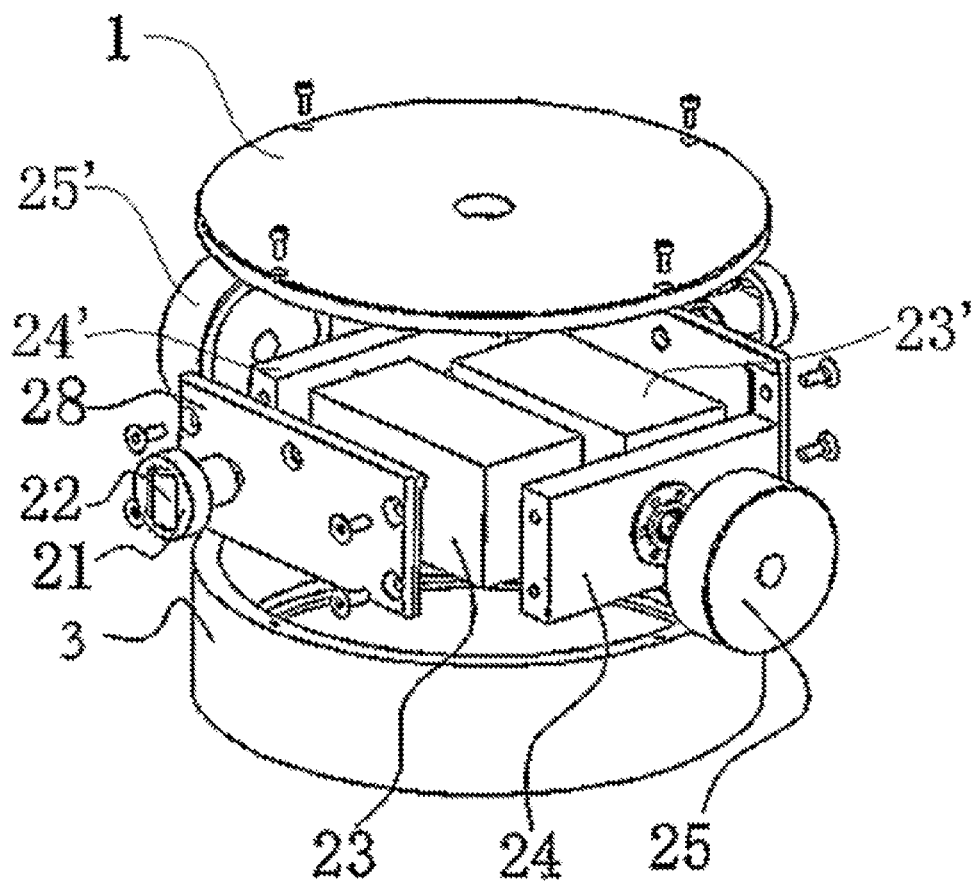
FIG. 5 is an overall exploded view of a differential drive device according to another embodiment of the present application.

As shown in FIG. 5, optionally, the differential drive unit 2 includes a first motor 23, a second motor 23', a first reducer 24, a second reducer 24', a first driving wheel 25 and a second driving wheel 25'; wherein: the first motor 23 and the second motor 23' are arranged side by side, and the output shafts of the first motor 23 and the second motor 23' face away from each other; the first reducer 24 is connected to the output shaft of the first motor 23, and the second reducer 24' is connected to the output shaft of the second motor 23'; the first driving wheel 25 is installed on a side of the first reducer 24 facing away from the first motor 23, and the second driving wheel 25' is installed on a side of the second reducer 24' facing away from the second motor 23'.

In this embodiment, the first driving wheel is driven by the first motor, and the second driving wheel is driven by the second motor. In the actual movement process, the differential drive unit can realize the functions of differential rotation in-situ and forward and backward walking by controlling the speed and the steering of the first motor and the second motor. In this embodiment, each of the components in the differential drive unit are arranged in a symmetrical manner, which can balance the forces on the two driving wheels of the differential drive unit, thereby enabling the differential drive unit to move more smoothly.

As an optional implementation of the embodiments of the present application, two limiting posts are provided on the side wall of the differential drive unit, a limiting plate is provided on the lower side of the top plate, and the limiting plate is located on the movement track of the limiting posts. In this embodiment, the limiting posts arranged on the side wall of the differential drive unit will rotate with the differential drive unit relative to the top plate; when the differential drive unit is installed on the AGV, the differential drive unit will connect to the AGV through the through-hole opened on the top plate (for example, the motor power supply line needs to be connected to the battery on the AGV). Therefore, the limiting plate on the top plate is matched with the limiting posts arranged on the differential drive unit to limit the rotation angle of the differential drive unit, thereby avoiding the situation that the differential drive unit rotates infinitely relative to the top plate and causes the connection to be twisted off.

Chassis structure of existing AGV is relatively complex and requires higher road surface flatness. Only one driving wheel may land on the ground when driving on the uneven road, resulting in insufficient traction, slipping, out of control and other phenomena.

In order to solve the above technical problems, as shown in FIG. 8 to FIG. 12, an embodiment of the present application provides a differential drive device 100. The differential drive device 100 includes a differential drive unit 10, a support body 20, and a mounting frame 30 formed by enclosing a top plate 31 and an outer cover 32. Specifically, the differential drive unit 10 is hinged to the support body 20 so that the differential drive unit 10 swings around the transverse axis relative to the support body 20. A receptacle cavity is formed in the mounting frame 30, and the support body 20 and the differential drive unit 10 are arranged in the receptacle cavity. The support body 20 supports the mounting frame 30, and the differential drive unit 10 is arranged to be rotatable around a longitudinal axis of the receptacle cavity. It can be understood that when the differential drive device 100 is applied to an AGV, it can be connected to a bottom of the AGV through the mounting frame 30. The top plate 31 and/or the outer cover 32 can be used to connect to the vehicle body of the AGV. After the mounting frame 30 is connected to the vehicle body, the top plate 31 is arranged horizontally.

According to the differential drive device 100 of the embodiments of the present application, the receptacle cavity is formed in the mounting frame 30, and the support body 20 and the differential drive unit 10 are arranged in the receptacle cavity. The support body 20 supports the mounting frame 30, and the differential drive unit 10 is arranged to be rotatable around a longitudinal axis of the receptacle cavity. At the same time, the differential drive unit 10 is hinged to the support body 20 so that the differential drive unit 10 can swing around the transverse axis relative to the support body 20. As a result, a "universal joint" structure is formed between the differential drive unit 10 and the mounting frame 30. That is to say, the differential drive unit 10 has two degrees of freedom of rotation relative to the mounting frame 30, first degree of freedom is the degree of freedom that the differential drive unit 10 can rotate about the longitudinal axis, and second degree of freedom is the degree of freedom that the differential drive unit 10 can swing about the transverse axis. The first degree of freedom is used to realize the steering function of the AGV under the action of the differential drive unit 10, and the second degree of freedom is used to adapt the differential drive unit 10 to the fluctuations of the road surface, so that the differential drive unit 10 maintains effective contact with the road surface, so as to avoid the phenomenon of slipping and out of control caused by insufficient traction. It can be seen that when the differential drive device 100 of the embodiment of the present application is applied to an AGV, it can effectively reduce AGV's requirements for the flatness of the road surface.

Figure 9:
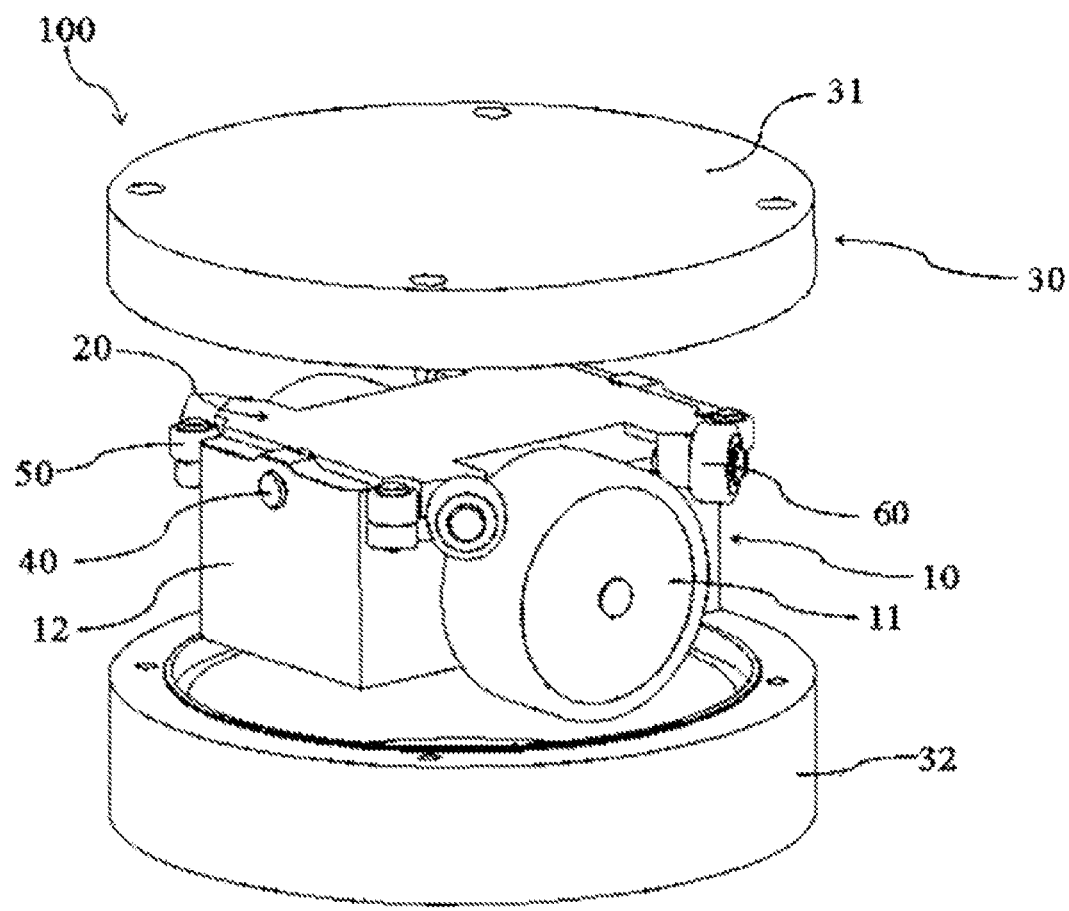
FIG. 9 is an overall exploded view of a differential drive device according to still another embodiment of the present application.

Optionally, the support body 20 is a horizontal support plate (as shown in FIG. 9), and the differential drive unit 10 is arranged below the horizontal support plate. The horizontal support plate refers to a plate structure arranged in the horizontal direction. In addition, in the case of the AGV running on the road, a direction parallel to the road surface can be understood as the horizontal direction. In this embodiment, the differential drive unit 10 is arranged below the horizontal support body, so that the horizontal support body can support the mounting frame 30.

Optionally, the differential drive device 100 further includes a connecting shaft 40. The differential drive unit 10 and the horizontal support body are connected by the connecting shaft 40, and a central axis of the connecting shaft 40 coincides with the transverse axis. Thus, the differential drive unit 10 is hinged to and the support body 20, so that the differential drive unit 10 can swing about the transverse axis relative to the support body 20.

Figure 10:
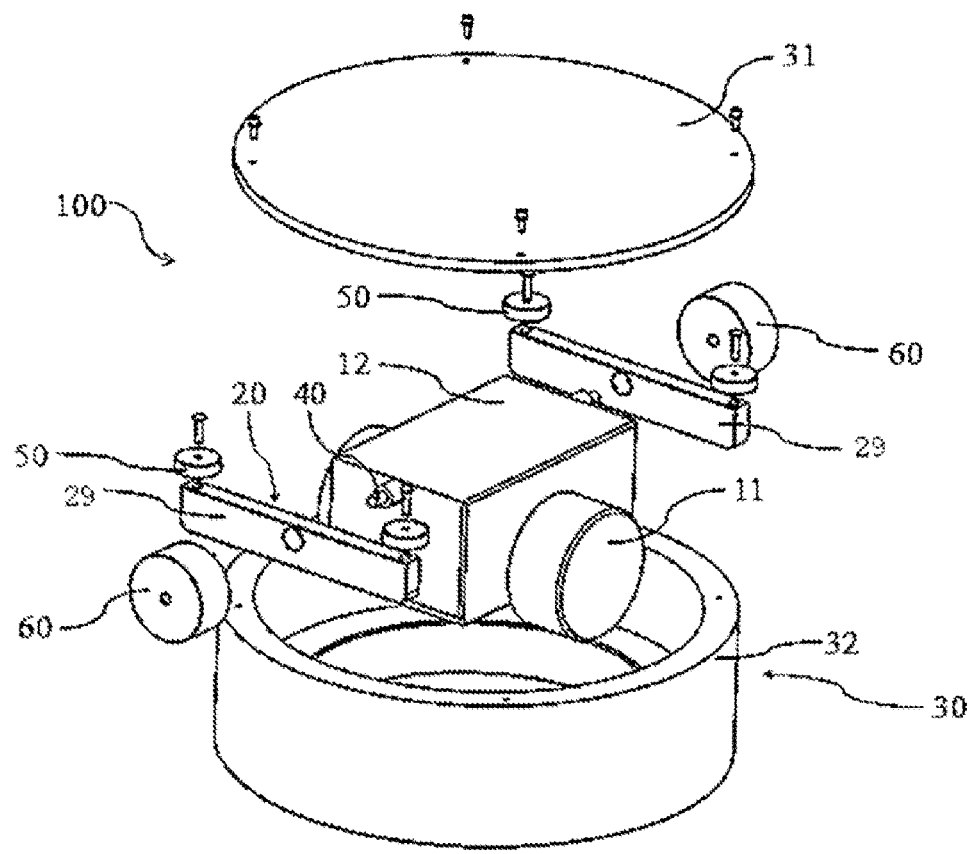
FIG. 10 is an overall exploded view of a differential drive device according to yet another embodiment of the present application.
Figure 11:
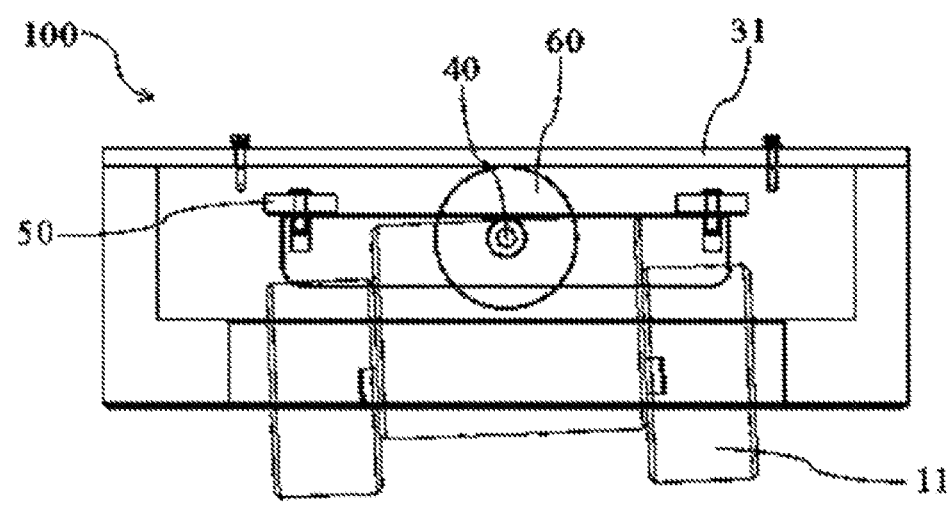
FIG. 11 is a schematic front view of a differential drive device according to an embodiment of the present application (a top plate is omitted)
Figure 12:
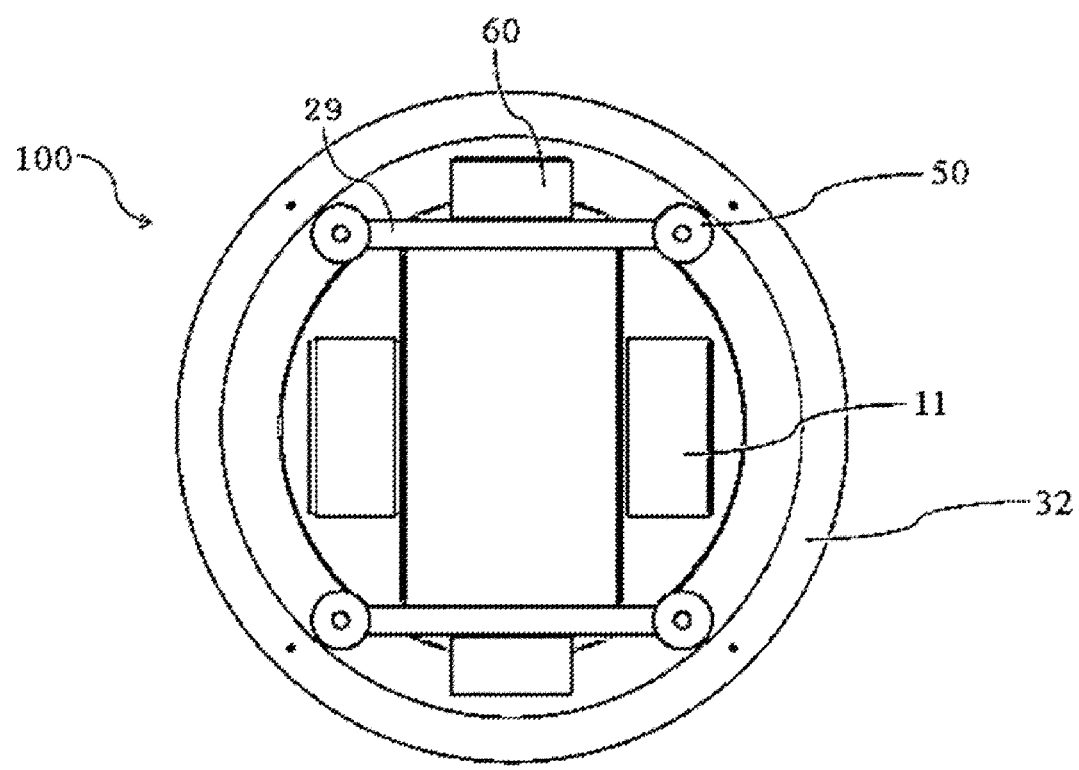
FIG. 12 is a schematic top view of a differential drive device according to an embodiment of the present application (a top plate is omitted).

Optionally, the support body 20 includes two vertical plates 29 arranged at intervals (as shown in FIG. 10 to FIG. 12), and the differential drive unit 10 is arranged between the two vertical plates 29. The vertical plate 29 refers to a plate structure with the plate surface arranged in the vertical direction. In this embodiment, the mounting frame 30 can also be supported by the two vertical plates 29 arranged at intervals. Further, the differential drive device 100 also includes a connecting shaft 40. The two vertical plates 29 and the differential drive unit 10 are connected by the connecting shaft 40, and the central axis of the connecting shaft 40 coincides with the transverse axis. Specifically, a middle of the connecting shaft 40 passes through the differential drive unit 10, and two ends of the connecting shaft 40 correspondingly pass through the two vertical plates 29. Thus, the differential drive unit 10 is hinged to the support body 20, so that the differential drive unit 10 can swing around the transverse axis relative to the support body 20.

Optionally, the differential drive device 100 further includes a first rolling member 50, and the first rolling member 50 is arranged between the differential drive unit 10 and the outer cover 32 or between the support 20 and the outer cover 32. The first rolling member 50 is used to enable the differential drive unit 10 to rotate around the longitudinal axis of the receptacle cavity, and is beneficial to ensure smooth and stable rotation of the differential drive device.

Optionally, there are a plurality of the first rolling members 50, and the plurality of the first rolling members 50 are arranged at intervals from each other, thereby facilitating a stable rotation relationship between the differential drive unit 10 and the mounting frame 30. Further, the first rolling member 50 may be a ball, a roller or a bearing, etc.

Optionally, as shown in FIG. 9, when the support 20 is a horizontal support plate, the first rolling member 50 may be arranged both on the differential drive unit 10 and the horizontal support plate. The rotation of the differential drive unit 10 around the longitudinal axis of the receptacle cavity can be realized by the rolling of the first rolling member 50 on the inner wall of the outer cover 32.

As shown in FIG. 10, when the support 20 adopts two vertical plates 29, the first rolling member 50 can be arranged on the differential drive unit 10 or the vertical plate 29, wherein since the differential drive unit 10 is arranged between the two vertical plates 29, in order to reduce the possibility of mutual interference between the components, it is a better way to arrange the first rolling member 50 on the vertical plate 29.

Optionally, the differential drive device 100 further includes a plurality of second rolling members 60 arranged on the support body 20, and the support body 20 supports the top plate 31 through the plurality of second rolling members 60. As a result, the weight of the vehicle body of the AGV is mainly transmitted to the support body 20 through the second rolling member 60, so that the first rolling member 50 does not bear the weight of the vehicle body, thereby preventing the first rolling member 50 from being deformed or even damaged.

Further, the second rolling member 60 may be a ball, a roller or a bearing, etc.

Optionally, as shown in FIG. 9, when the support body 20 is a horizontal support plate, the second rolling member 60 can be arranged at the corner of the horizontal support plate. Specifically, a protrusion can be formed at the corner of the horizontal support plate, and then the second rolling member 60 can be installed on the protrusion. As a result, the second rolling member 60 is less likely to interfere with other structures. In addition, if the second rolling member 60 is a roller or bearing, the rotating shaft thereof can be arranged parallel to the plate surface of the horizontal support plate, so that the second rolling member 60 can provide a more stable support for the top plate 31.

As shown in FIG. 10, when the support 20 adopts two vertical plates 29, the second rolling member 60 can be arranged on the outer side of the vertical plate 29 (a side facing away from the differential drive unit 10). In addition, if the second rolling member 60 is a roller or bearing, the rotating shaft thereof can be arranged parallel to the plate surface of the horizontal support plate, so that the second rolling member 60 can provide a more stable support for the top plate 31.

In addition, the rotating shaft of the second rolling member 60 and the connecting shaft 40 can also be integrated as an integral part, that is, the end of the connecting shaft 40 can be extended, and the second rolling member 60 can be installed on the end of the connecting shaft 40, so that the number of parts can be reduced and the cost can be saved.

Optionally, the differential drive unit 10 includes a driving wheel 11 and a power unit 12 connected to the driving wheel 11, wherein the power unit 12 provides power for the rotation of the driving wheel 11, and the power unit 12 is hinged to the support body 20.

Optionally, an axle of the driving wheel 11 is perpendicular to the transverse axis. In this case, when the power unit 12 swings around the transverse axis, the height of the driving wheel 11 changes most significant, so that the driving wheel 11 can adapt to the height change of the road surface to the greatest extent.

Optionally, the number of the driving wheels 11 is two, and the forward direction of the AGV can be controlled by implementing different control methods for the two driving wheels 11. For example, when the two driving wheels 11 rotate in the positive direction at the same speed, the AGV can be driven forward; when the two driving wheels 11 rotate in the opposite directions at the same speed, the AGV can be driven backward; and when the two driving wheels 11 rotate forward at different speeds or when one of the two driving wheels 11 rotates forward and the other rotates backward, the AGV can be driven to turn.

It can be understood that a supporting wheel may be additionally provided at the bottom of the AGV to cooperate with the differential drive device 100 to support the AGV and make the AGV moving on the ground. Alternatively, a plurality of differential drive devices 100 can also be arranged at the bottom of the AGV to make the AGV obtaining stable support.

Optionally, the power unit 12 includes a motor and a reduction mechanism (not shown in the figure). The motor is connected to the driving wheel 11 through a reduction mechanism (for example, a gear reduction mechanism, a planetary gear reduction mechanism, etc.), thereby reducing the output speed of the motor and increasing the output torque of the motor.

Optionally, the number of the motor is one. At this time, the reduction mechanism can choose a differential reducer.

As a result, the two driving wheels 11 can be controlled by one motor to rotate in the same direction at the same speed, in the same direction at different speeds, or to rotate in opposite directions, so that the driving wheels 11 can drive the AGV forward, backward and turn.

Optionally, the number of the motors and the reduction mechanisms can also be two respectively, that is, each of the motors is connected to one driving wheel 11 through one reduction mechanism. As a result, the corresponding driving wheels 11 are controlled by different motors, so as to achieve that the two driving wheels 11 rotate in the same direction at the same speed, in the same direction at different speeds, or in the opposite directions to each other, and the like.

Optionally, a ring-shaped limiting slot is formed on the side wall of the receptacle cavity (not shown in the drawings). The end of the connecting shaft 40 extends out of the differential drive unit 10 and is arranged in the limiting slot. As a result, it can be ensured that the connecting shaft 40 is always in a horizontal direction, so that the support body 20 can form an effective and stable support for the mounting frame 30.

An embodiment of the present application also provides an AGV which includes the differential drive device in any of the embodiments described above.

According to the AGV of the embodiment of the present application, a receptacle cavity is formed in the mounting frame of the differential drive device thereof. The support body and the differential drive unit are arranged in the receptacle cavity, the support body supports the mounting frame, and the differential drive unit is arranged to be rotatable around the longitudinal axis of the receptacle cavity. At the same time, the differential drive unit is hinged to the support body, so that the differential drive unit swings around the transverse axis relative to the support body. As a result, a "universal joint" structure is formed between the differential drive unit and the mounting frame. That is to say, the differential drive unit has two degrees of freedom of rotation relative to the mounting frame, first degree of freedom is the degree of freedom that the differential drive unit can rotate about the longitudinal axis, and second degree of freedom is the degree of freedom that the differential drive unit can swing about the transverse axis. The first degree of freedom is used to realize the steering function of the AGV under the action of the differential drive unit, and the second degree of freedom is used to adapt the differential drive unit to the fluctuations of the road surface, so that the differential drive unit maintains effective contact with the road surface, so as to avoid the phenomenon of slipping and out of control caused by insufficient traction. It can be seen that when the differential drive device of the embodiment of the present application is applied to an AGV, it can effectively reduce AGV's requirements for the flatness of the road surface.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "include(s) a/an . . . " does not exclude additional identical elements in the processes, methods, articles, or devices, including the listed elements.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A differential drive device, comprising a differential drive unit, a top plate and an outer cover, wherein the top plate is installed on a top end of the outer cover, the differential drive unit is located in the outer cover at a lower side of the top plate, the top plate is supported above the differential drive unit, an inner side wall of the outer cover is circular-shaped,
wherein a first rolling member is provided on a first side of the differential drive unit, the first rolling member is in rolling connection with the lower side of the top plate.

2. The differential drive device according to claim 1, wherein the first rolling member comprises two first rolling members installed on a first side and an opposite side thereto of the differential drive unit respectively, the two first rolling members are arranged symmetrically about a center of slewing of the differential drive unit.

3. The differential drive device according to claim 1, wherein a second rolling member is provided on a second side of the differential drive unit, the second rolling member is in rolling connection with the inner side wall of the outer cover.

4. The differential drive device according to claim 3, wherein the second rolling member comprises two second rolling members installed on the second side and an opposite side thereto of the differential drive unit respectively, the two second rolling members are arranged symmetrically about the center of slewing of the differential drive unit.

5. The differential drive device according to claim 3, wherein the second rolling member is a roller bearing, a bearing seat is provided on a side wall of the differential drive unit, and the roller bearing is installed on the bearing seat.

6. The differential drive device according to claim 1, wherein
an end of the first rolling member close to the inner side wall of the outer cover is provided with a groove, a second rolling member is installed in the groove, and the second rolling member partially protrudes out of the groove and is in rolling connection with the inner side wall of the outer cover; or
wherein a through-hole is provided on the top plate, and the differential drive unit is connected to an automated guided vehicle through the through-hole.

7. The differential drive device according to claim 1, wherein a top end of the first rolling member is higher than the differential drive unit;
a slewing diameter of the differential drive unit is smaller than an inner diameter of the outer cover.

8. The differential drive device according to claim 1, wherein a pin shaft is provided on a second side of the differential drive unit, an annular limiting slot is provided at a position on the inner side wall of the outer cover corresponding to the pin shaft, an end of the pin shaft close to the outer cover is located in the limiting slot.

9. The differential drive device according to claim 1, wherein the differential drive unit comprises a first motor, a second motor, a first reducer, a second reducer, a first driving wheel and a second driving wheel; wherein
the first motor and the second motor are arranged side by side, and output shafts of the first motor and the second motor face away from each other;
the first reducer is connected to the output shaft of the first motor, and the second reducer is connected to the output shaft of the second motor;
the first driving wheel is installed on a side of the first reducer facing away from the first motor, and the second driving wheel is installed on a side of the second reducer facing away from the second motor.

10. The differential drive device according to claim 1, further comprising: a support body;
the differential drive unit is hinged to the support body, so that the differential drive unit swings around a transverse axis relative to the support body;
the top plate and the outer cover are enclosed to form a mounting frame, and a receptacle cavity is formed in the mounting frame, the support body and the differential drive unit are arranged in the receptacle cavity, the support body supports the mounting frame, and the differential drive unit is arranged in a rotatable manner around a longitudinal axis of the receptacle cavity.

11. The differential drive device according to claim 10, wherein the support body is a horizontal support plate, and the differential drive unit is arranged below the horizontal support plate; or
wherein the support body comprises two vertical plates arranged at intervals, and the differential drive unit is arranged between the two vertical plates.

12. The differential drive device according to claim 11, further comprising a connecting shaft, the differential drive unit and the horizontal support plate are connected by the connecting shaft, and a central axis of the connecting shaft coincides with the transverse axis.

13. The differential drive device according to claim 12, wherein a ring-shaped limiting slot is formed on the side wall of the receptacle cavity, the end of the connecting shaft extends out of the differential drive unit and is arranged in the limiting slot.

14. The differential drive device according to claim 11, wherein further comprising a connecting shaft, the two vertical plates and the differential drive unit are connected by the connecting shaft, and a central axis of the connecting shaft coincides with the transverse axis.

15. The differential drive device according to claim 10, wherein the first rolling member is arranged between the differential drive unit and the outer cover or between the support body and the outer cover.

16. The differential drive device according to claim 15, wherein the first rolling member is a ball, a roller or a bearing; or
the differential drive device further comprises a plurality of second rolling members arranged on the support body, the support body supports the top plate through the plurality of second rolling members.

17. The differential drive device according to claim 16, wherein each of the plurality of second rolling members is a ball, a roller or a bearing.

18. The differential drive device according to claim 10, wherein the differential drive unit comprises a driving wheel and a power unit connected to the driving wheel, and the power unit is hinged to the support body.

19. The differential drive device according to claim 18, wherein an axle of the driving wheel is perpendicular to the transverse axis.

20. An automated guided vehicle, comprising the differential drive device according to claim 1.

* * * * *